United States Patent
Toyokawa et al.

(10) Patent No.: US 8,183,996 B2
(45) Date of Patent: May 22, 2012

(54) MOBILE INFORMATION-TERMINAL APPARATUS, MOBILE INFORMATION-TERMINAL CONTROL METHOD, AND MOBILE INFORMATION-TERMINAL PROGRAM

(75) Inventors: Takashi Toyokawa, Inagi (JP); Hiroki Kishimoto, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 636 days.

(21) Appl. No.: 11/316,709

(22) Filed: Dec. 27, 2005

(65) Prior Publication Data
US 2007/0046458 A1 Mar. 1, 2007

(30) Foreign Application Priority Data

Aug. 31, 2005 (JP) ................. 2005-252743

(51) Int. Cl.
*G08B 1/08* (2006.01)
*G05B 23/00* (2006.01)
*G06F 17/00* (2006.01)
*G06Q 30/00* (2006.01)
*G06Q 10/00* (2006.01)

(52) U.S. Cl. ............. 340/539.11; 340/539.13; 340/5.91; 700/90; 705/26; 705/1

(58) Field of Classification Search ............. 340/539.11, 340/5.91, 539.13; 701/207
See application file for complete search history.

(56) References Cited

U.S. PATENT DOCUMENTS

| | | | | |
|---|---|---|---|---|
| 4,750,151 | A * | 6/1988 | Baus ........................ | 700/90 |
| 5,821,513 | A | 10/1998 | O'Hagan et al. | |
| 7,242,292 | B2 * | 7/2007 | Berezowski et al. ..... | 340/539.11 |
| 2005/0027443 | A1 * | 2/2005 | Cato ........................ | 701/207 |
| 2006/0074763 | A1 * | 4/2006 | Schmid .................... | 705/26 |
| 2006/0122855 | A1 * | 6/2006 | Prorock ................... | 705/1 |
| 2006/0145838 | A1 * | 7/2006 | Alvarez et al. .......... | 340/539.13 |

FOREIGN PATENT DOCUMENTS

| | | |
|---|---|---|
| JP | 11-064505 A | 3/1999 |
| JP | 11-152041 | 6/1999 |
| JP | 2001-034850 A | 2/2001 |
| JP | 2002-56278 | 2/2002 |
| JP | 2002-269449 A | 9/2002 |
| JP | 2003-256705 A | 9/2003 |
| JP | 2004-70410 | 3/2004 |
| JP | 2004-258928 A | 9/2004 |
| JP | 2005-025116 A | 1/2005 |
| JP | 2005-056173 A | 3/2005 |

OTHER PUBLICATIONS

Korean Office Action dated Dec. 20, 2006 (mailing date), issued in corresponding Korean Patent Application No. 10-2006-0004399.
Chinese Office Action dated Aug. 21, 2009 (Date of Issue), issued in corresponding Chinese Patent Application No. 200610001918.3.

(Continued)

*Primary Examiner* — George Bugg
*Assistant Examiner* — Jack Wang
(74) *Attorney, Agent, or Firm* — Westerman, Hattori, Daniels & Adrian, LLP

(57) ABSTRACT

A mobile information-terminal apparatus moves with a user and provides information to the user. A position-information detecting unit receives signals transmitted from a plurality of transmitters installed in a site to respective areas that are allocated to the transmitters, and detects position information based on the received signals. A position-related-information informing unit that informs the user of related information that corresponds to the position information based on the detected position information.

18 Claims, 11 Drawing Sheets

OTHER PUBLICATIONS

Japanese Office Action dated Sep. 14, 2010 (mailing date), issued in related Japanese Patent Application No. 2005-252743.

Japanese Office Action dated Apr. 5, 2011, issued in corresponding Japanese Patent Application No. 2005-252743.

* cited by examiner

FIG.4
FIG.5
FIG.6

| IR NUMBER | MAIN CONTENT URL | MAP POSITION COORDINATES |
|---|---|---|
| 101 | C:¥ Contents ¥ LMCM0001.swf | 10,20 |
| 102 | ¥ ¥ 10.144.155.16 ¥ Contents ¥ CMCM0002.swf | 10,40 |
| 103 | C:¥ Contents ¥ LMCM0003.swf | 20,10 |
| ... | ... | ... |
| ... | ... | ... |

| SETTING CONTENTS | SET VALUE |
|---|---|
| RECEPTION POLLING TIMER | 3 |
| POSITIONAL INFORMATION RECEPTION NUMBER | 5 |
| CONTENT ACTIVATION TIMER | 10 |
| PREVIOUS ACTIVATION CONTENT AVOIDANCE | 1 |
| OPERATION ACTIVATION TIMER | 10 |

FIG.10

| IR NUMBER | MAIN CONTENT URL | TOP BANNER URL | BOTTOM BANNER URL | MAP POSITION COORDINATES |
|---|---|---|---|---|
| 101 | C:¥Contents¥LMCM0001.Swf | C:¥Contents¥LURC0001.swf | C:¥Contents¥LUSP0001.swf | 10,20 |
| 102 | ¥¥10.144.155.16¥Contents¥CMCM0002.swf | ¥¥10.144.155.16¥Contents¥CURC0002.swf | ¥¥10.144.155.16¥Contents¥CUSP0002.swf | 10,40 |
| 103 | C:¥Contents¥LMCM0003.swf | C:¥Contents¥LURC0003.swf | C:¥Contents¥LUSP0003.swf | 20,10 |
| ... | ... | ... | ... | ... |
| ... | ... | ... | ... | ... |

FIG.11

| IR NUMBER | MAIN CONTENT URL | RECIPE INFORMATION URL | BOTTOM BANNER URL | MAP POSITION COORDINATES |
|---|---|---|---|---|
| 101 | C:￥Contents￥LMCM0001.swf | C:￥Contents￥LMRC0001.swf | C:￥Contents￥LMSP0001.swf | 10,20 |
| 102 | ￥￥10.144.155.16￥Contents￥CMCM0002.swf | ￥￥10.144.155.16￥Contents￥CMRC0002.swf | ￥￥10.144.155.16￥Contents￥CMSP0002.swf | 10,40 |
| 103 | C:￥Contents￥LMCM0003.swf | C:￥Contents￥LMRC0003.swf | C:￥Contents￥LMSP0003.swf | 20,10 |
| ... | ... | ... | ... | ... |
| ... | ... | ... | ... | ... |

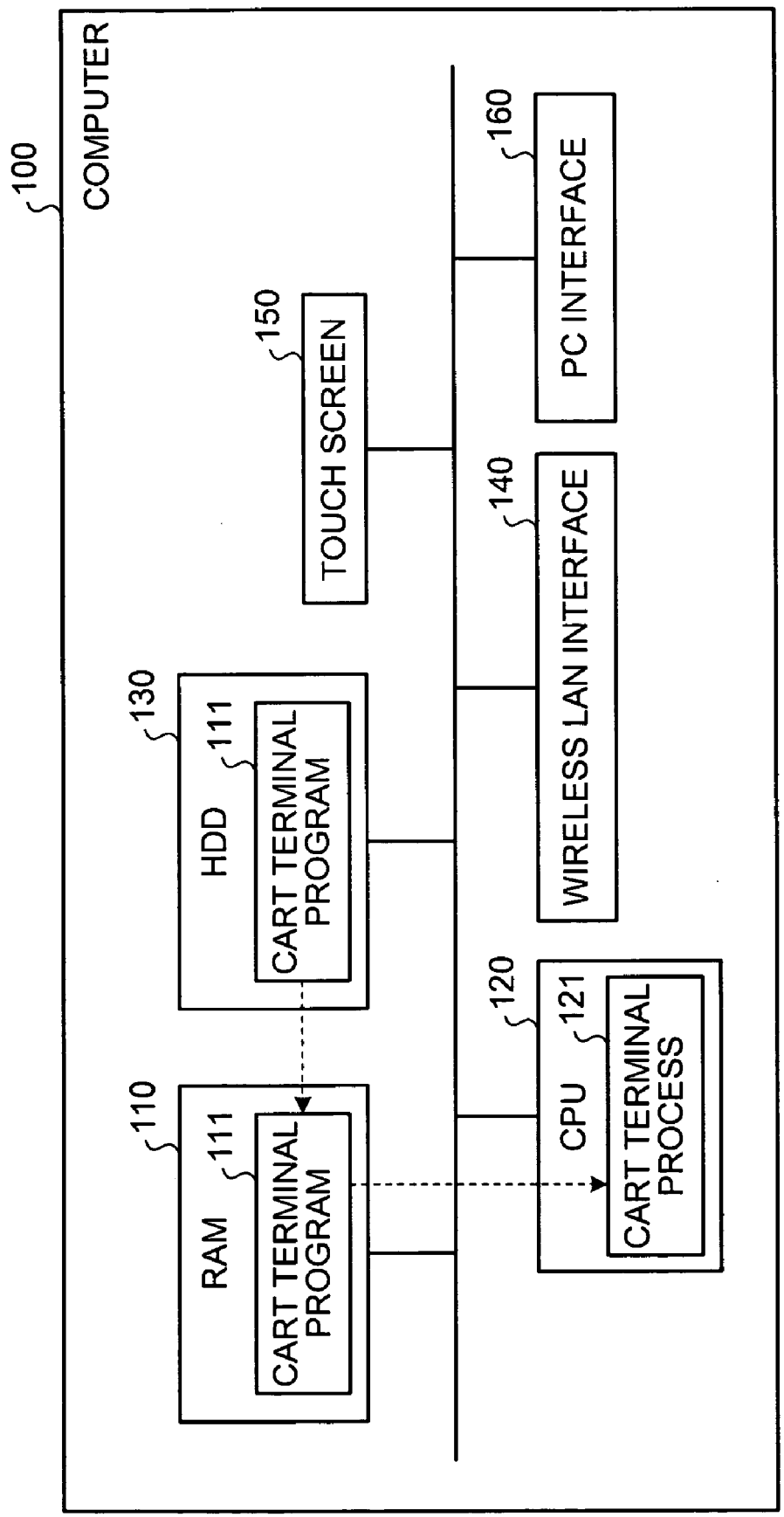

MOBILE INFORMATION-TERMINAL APPARATUS, MOBILE INFORMATION-TERMINAL CONTROL METHOD, AND MOBILE INFORMATION-TERMINAL PROGRAM

BACKGROUND OF THE INVENTION

1. Field of the Invention

The present invention relates to a technology for providing a moving user with information corresponding to a position of the user.

2. Description of the Related Art

Recently, stores such as supermarkets and drugstores have been using a system in which an information terminal is installed on a shelf or the like where products are arranged and information relating to these products is provided to the user by means of a still image or a video.

In addition, a system that provides information relating to products by installing information terminals on carts used inside the stores by users, who can use the information terminals to read barcodes attached to the products while they shop has been proposed (see, for example, Japanese Patent Application Laid-open No. 2002-56278).

However, the above conventional technologies have a problem that users cannot obtain product information without intentionally using the information terminals, and consequently information relating to special sales and new products that may be of interest to the user cannot be provided to the users.

SUMMARY OF THE INVENTION

It is an object of the present invention to at least solve the problems in the conventional technology.

A mobile information-terminal apparatus according to one aspect of the present invention moves with a user and provides information to the user. The mobile information-terminal apparatus includes a position-information detecting unit that receives signals transmitted from a plurality of transmitters installed in a site to respective areas that are allocated to the transmitters, and detects position information based on the received signals; and a position-related-information informing unit that informs the user of related information that corresponds to the position information based on the detected position information.

A method of controlling a mobile information-terminal apparatus, according to another aspect of the present invention, includes receiving signals transmitted from a plurality of transmitters installed in a site to respective areas that are allocated to the transmitters; detecting position information based on the received signals; and informing the user of related information that corresponds to the position information based on the detected position information.

A computer-readable recording medium according to still another aspect of the present invention stores a computer program that realizes the above method according to the present invention on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic of an example of a main menu screen;

FIG. 5 is a schematic of an example of a shopping total screen;

FIG. 6 is a schematic of an example of a content displayed in conjunction with position information;

FIG. 10 is a table of an example of the position/content-related-setting storing unit when outputting the top and bottom banners;

FIG. 11 is a table of an example of the position/content-related-setting storing unit when setting a navigation mode;

FIG. 15 is a functional block diagram of a computer that executes a cart terminal program according to the present embodiment.

DETAILED DESCRIPTION OF THE PREFERRED EMBODIMENTS

Exemplary embodiments of the present invention are explained below in detail with reference to the accompanying drawings. The explanation of the present embodiments centers on an example in which the present invention is applied to a store such as a supermarket and a convenience store.

Figure 1:
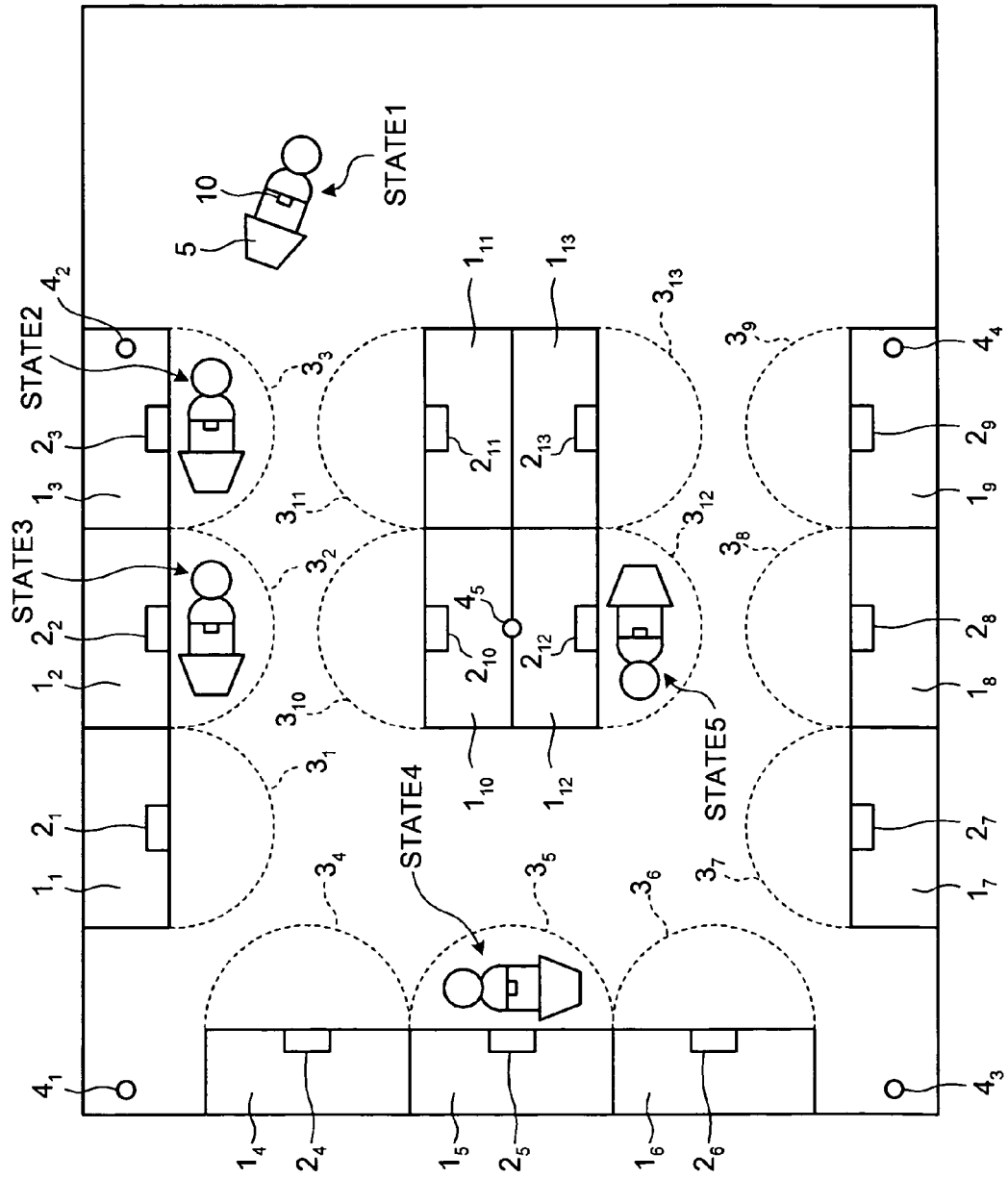
FIG. 1 is a schematic for illustrating a concept of a navigation cart system according to an embodiment of the present invention.

FIG. 1 is a schematic for illustrating a concept of a navigation cart system according to an embodiment of the present invention.

In the example shown in FIG. 1, shelves $1_1$ to $1_{13}$ exhibit products in a store such as a supermarket and a convenience store.

A plurality of infrared (IR) transmitters $2_1$ to $2_{13}$ are respectively installed on the shelves $1_1$ to $1_{13}$. The IR transmitters $2_1$ to $2_{13}$ regularly transmit position information (IR signals) indicating positions of the shelves $1_1$ to $1_{13}$ where they are installed.

IR transmission areas $3_1$ to $3_{13}$ are coverage areas of the IR transmitters $2_1$ to $2_{13}$ where the position information (IR signals) transmitted from corresponding IR transmitters $2_1$ to $2_{13}$ can be received.

A cart terminal apparatus 10 is installed on a cart 5 used by a user in the store and provides the user with information relating to the products. The cart terminal apparatus 10 includes an IR receiver that reads the position information transmitted from the IR transmitters $2_1$ to $2_{13}$, and a scanner that reads barcodes of tags that are attached to the products.

A plurality of wireless base stations $4_1$ to $4_5$ is installed along an aisle that the cart 5 passes along inside the store such that the aisle can be entirely covered by the wireless areas. The cart terminal apparatus 10 is connected to a store server via a wireless local-area-network (LAN) formed by the wireless base stations $4_1$ to $4_5$.

The cart terminal apparatus 10 stores the position information transmitted by the IR transmitters $2_1$ to $2_{13}$ in correspondence with contents. When the cart terminal apparatus 10 receives position-information from an IR receiver, it displays the contents relating to products exhibited on the nearby shelves $1_1$ to $1_{13}$ on a screen.

For example, vegetables are exhibited on the shelf $1_1$ and fish on the shelf $1_2$. When the cart 5 is not yet near the shelves $1_1$ to $1_{13}$, the cart terminal apparatus 10 displays an initial screen including a main menu on the screen (state 1). When the user moves the cart 5 into an IR transmission area $3_3$, the cart terminal apparatus 10 displays contents such as bargain information relating to vegetables, information describing nutrients in specific vegetables, and so on, on the screen (state 2). When the user moves the cart 5 into an IR transmission area $3_2$, the cart terminal apparatus 10 displays contents such as bargain information relating to fish, information on where the fish is from, and so on, on the screen (state 3). When the user then moves the cart 5 into an IR transmission area $3_5$, the cart terminal apparatus 10 displays contents relating to products exhibited on shelf $1_5$ on the screen (state 4), and when the cart 5 enters an IR transmission area $3_{12}$, the cart terminal apparatus 10 displays contents relating to products exhibited on shelf $1_{12}$ (state 5).

The contents that are stored in the cart terminal apparatus 10 are downloaded from the store server via the wireless LAN when a store staff member turns on the power of the cart terminal apparatus 10 before the store opens for business. Modified contents are also downloaded regularly from the store server after the store closes, to maintain an up-to-date state.

When the user holds a product near to the scanner that is installed to the cart terminal apparatus 10, the scanner reads the barcode of the tag that is attached to the product. Based on the barcode read by the scanner, the cart terminal apparatus 10 obtains information relating to the product from the store server and displays it on a shopping total screen. The display switches automatically to this shopping total screen as the user moves near the product, even when the main menu and contents corresponding to the position information are being displayed.

In the navigation cart system according to this embodiment, the cart terminal apparatus 10 recognizes the position of the cart 5 within the store at any point in time and display information relating to nearby products, making it possible to provide the user with information that is useful for shopping in real time.

While only five wireless base stations $4_1$ to $4_5$ are shown to simplify the explanation, this navigation cart system can include any number of wireless base stations according to the size of the store.

Although position information is recognized by using IR transmitters and IR receivers according to the present embodiment, the position information can be also recognized using IC tags and IC tag readers.

Although one IR transmitter is provided for each shelf according to the present embodiment, the present invention is not limited to this arrangement, and can be similarly applied when the areas where products are exhibited are divided more finely and one IR transmitted is installed in each of the divided areas.

Figure 2:
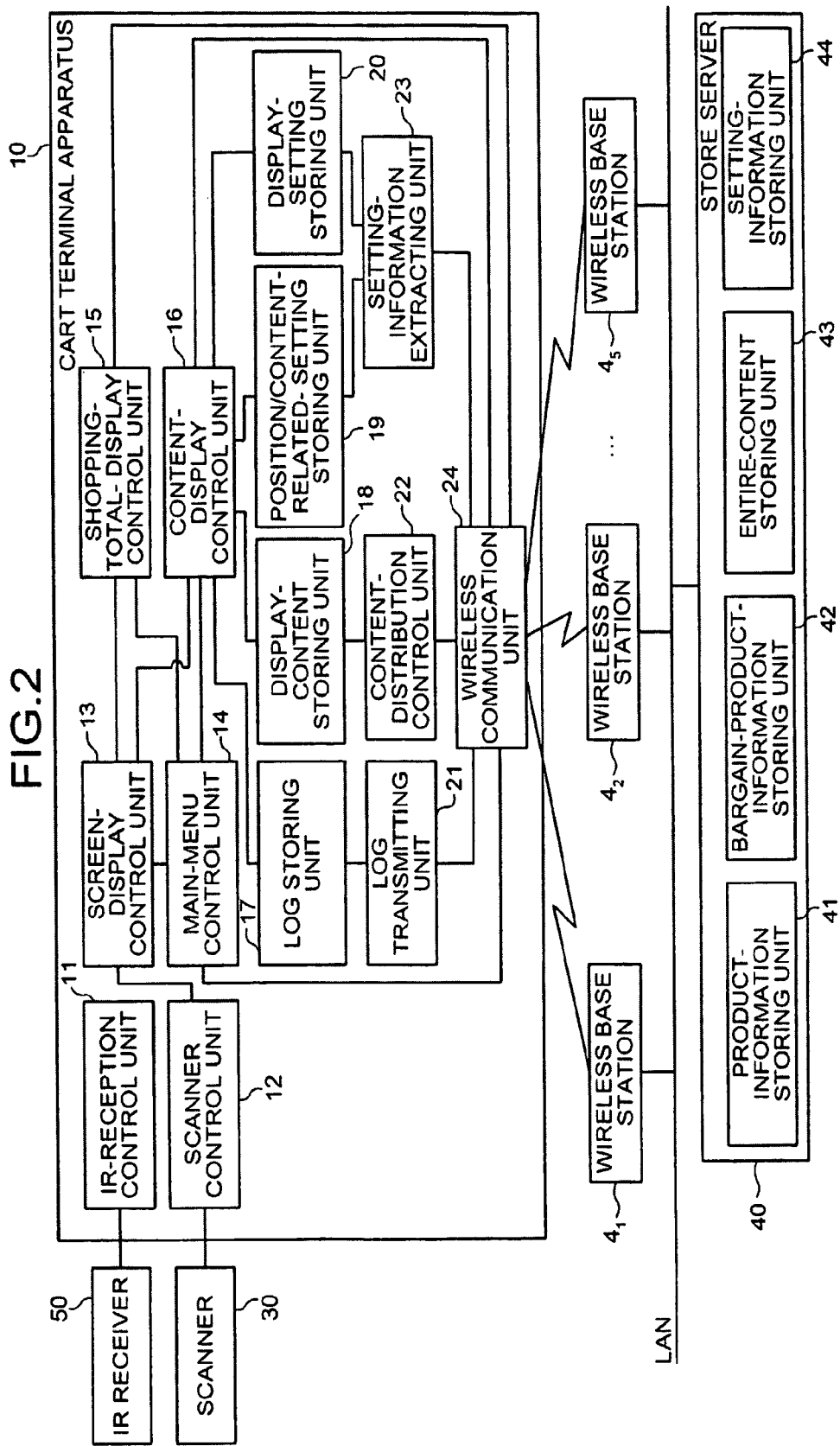
FIG. 2 is a functional block diagram of the navigation cart system according to the present embodiment.

FIG. 2 is a functional block diagram of the navigation cart system according to the present embodiment. In the navigation cart system, the cart terminal apparatus 10 is installed on a cart used by a user and is connected via a wireless LAN to a store server 40 that holds information for distribution to the cart terminal apparatus 10. An IR receiver 50 and a scanner 30 are connected to the cart terminal apparatus 10.

The IR receiver 50 reads the position information transmitted by a plurality of IR transmitters installed in the store. The scanner 30 reads a barcode from a tag attached to a product.

Figure 3:
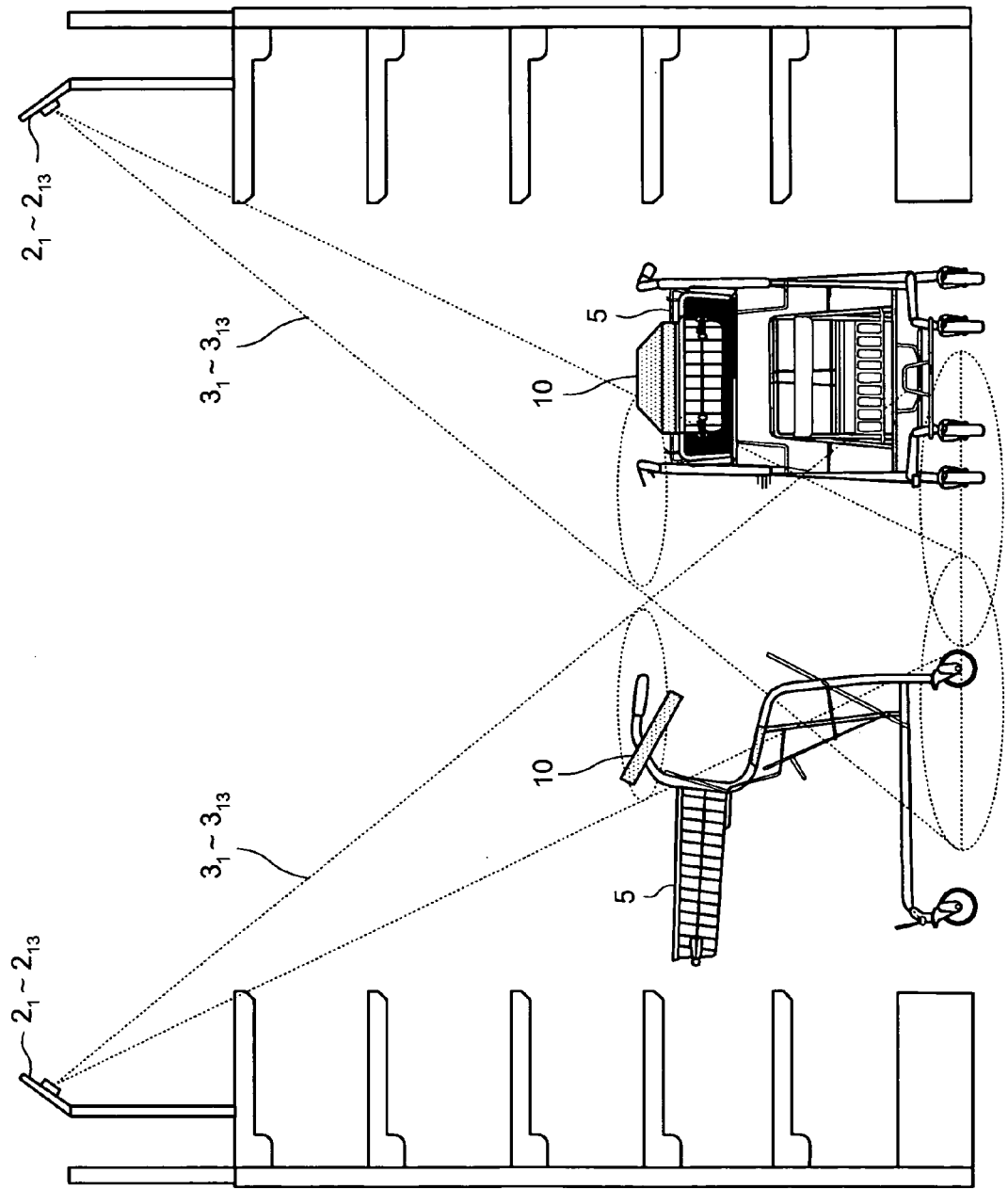
FIG. 3 is a schematic of a cart on which a cart terminal apparatus according to the present embodiment is installed.

The cart terminal apparatus 10 displays contents relating to products on sale nearby according to its position inside the store. The cart terminal apparatus 10 is installed on the cart 5 that moves with the user around the store. FIG. 3 is a schematic of a cart on which the cart terminal apparatus 10 according to the present embodiment is installed. As shown in FIG. 3, the cart terminal apparatus 10 is installed on the cart 5 such that, when the user uses the cart 5 inside the store, the cart terminal apparatus 10 can recognize IR transmission areas $3_1$ to $3_{13}$ that are transmitted from the IR transmitters $2_1$ to $2_{13}$.

The cart terminal apparatus 10 includes an IR-reception control unit 11, a scanner control unit 12, a screen-display control unit 13, a main-menu control unit 14, a shopping-total-display control unit 15, a content-display control unit 16, a log storing unit 17, a display-content storing unit 18, a position/content-related-setting storing unit 19, a display-setting storing unit 20, a log transmitting unit 21, a content-distribution control unit 22, a setting-information extracting unit 23, and a wireless communication unit 24.

The IR-reception control unit 11 detects an IR number from the position information read by the IR receiver 50. The scanner control unit 12 detects a product code from the barcode read by the scanner 30.

The screen-display control unit 13 controls the main-menu control unit 14, the shopping-total-display control unit 15, and the content-display control unit 16. Specifically, the screen-display control unit 13 shifts controls between the control units, and passes data between the IR-reception control unit 11, the scanner control unit 12, and the control units.

The main-menu control unit 14 displays a main menu screen and processes it according to a menu selected by the user. FIG. 4 is a schematic of an example of the main menu screen. As shown in FIG. 4, the user can select one menu from among "Recipe", "Bargain", "Product Search", and "Shopping Total", from the main menu screen.

When the user selects "Recipe", the main-menu control unit 14 displays a screen that introduces recipes. When the user specifies a recipe the user wishes to see, the main-menu control unit 14 downloads contents relating to that recipe from the store server 40, and displays the downloaded contents on the screen.

When the user selects "Bargain", the main-menu control unit 14 displays a screen that introduces bargains. When the user specifies a bargain product the user wishes to see, the main-menu control unit 14 downloads contents relating to the bargain product from the store server 40 and displays the downloaded contents on the screen.

When the user selects "Product Search", the main-menu control unit 14 displays a screen for searching for products. When the user specifies a product the user wishes to search for, a floor map of the store is displayed on the screen. Simultaneously, coordinates indicating the position of the product are obtained from the store server 40 and the position of the product is output on the map. In addition, the position of the cart 5 is output on the map based on map position coordinates obtained from the position/content-related-setting storing unit 19 by the content-display control unit 16.

Since the main-menu control unit 14 executes processes selected from the main menu in this way, the user can easily obtain information that is useful for shopping by operating the main menu.

When the user selects "Shopping Total", the main-menu control unit 14 displays a shopping total screen, and outputs all the product information in shopping list information accumulated by the shopping-total-display control unit 15 and a total price.

The shopping-total-display control unit 15 accumulates shopping list information relating to products that the user intends to purchase, and displays a shopping total screen. Specifically, based on a product code detected by the scanner control unit 12, the shopping-total-display control unit 15 obtains prices of the products from a product-information storing unit 41 and a bargain-product-information storing unit 42 of the store server 40, and accumulates them as the shopping list information. The shopping total screen is simultaneously displayed. FIG. 5 is a schematic of an example of the shopping total screen. As shown in FIG. 5, the shopping total screen displays all the products accumulated at that point as shopping list information and their total price.

By displaying the shopping total screen in conjunction with the scanner, the shopping-total-display control unit 15 enables the user to ascertain the total price of the products the user intends to purchase.

The content-display control unit 16 controls the display of contents. Specifically, based on an IR number detected by the IR-reception control unit 11, the content-display control unit 16 obtains the URL of the corresponding content and map position coordinates from the position/content-related-setting storing unit 19. The content-display control unit 16 then executes a sequence of checks to determine whether to display each of the contents based on a value that is set in the display-setting storing unit 20.

The content-display control unit 16 first executes a reception-polling-timer check. In the reception-polling-timer check, the time since receiving the previous position information is compared with a time that is set as a reception polling timer in the display-setting storing unit 20. If the time since receiving the previous position information is shorter, the content-display control unit 16 ends the processing without displaying the content. If the time since receiving the previous position information is longer, the content-display control unit 16 stores a position information log that indicates the IR number in the log transmitting unit 21, and then executes a position information reception number check.

In the position information reception number check, the number of times that the same position information has been received is compared with a number set as a position information reception number in the display-setting storing unit 20. If the number of times that the same position information has been received is lower, the content-display control unit 16 ends the processing without displaying the content, and if it is higher, the content-display control unit 16 executes a content activation timer check.

In the content activation timer check, the time since the previous content activation is compared with a time set as a content activation timer in the display-setting storing unit 20. If the time since the previous content activation is shorter, the content-display control unit 16 ends the processing without displaying the content, and if it is longer, the content-display control unit 16 then executes a previous activation content check.

In the previous activation content check, when a time set as a previous activation content check in the display-setting storing unit 20 is "1", the URL of the content that is previously activated is compared with the URL of the content that corresponds to the received IR number. If it is found by the comparison that both contents are the same, the content-display control unit 16 ends the processing without displaying the content. On the other hand, if they are different, the content-display control unit 16 executes an operation activation timer check.

In the operation activation timer check, the time since the user previously operated the terminal is compared with a time set as an operation activation timer in the display-setting storing unit 20. If the time since the user previously operated the terminal is shorter, the content-display control unit 16 ends the processing without displaying the content, and if it is longer, the content-display control unit 16 displays the content on the screen.

In displaying the content, the content-display control unit 16 refers to the URL of the content that corresponds to the position information, and determines whether the URL indicates the cart terminal apparatus 10 or the store server 40. If the URL indicates the cart terminal apparatus 10, the content-display control unit 16 extracts the content from a storage location in the cart terminal apparatus 10 indicated by the URL. On the other hand, if the URL indicates the store server 40, the content-display control unit 16 extracts the content from a storage location in the store server 40 indicated by the URL.

The extracted content is then displayed on the screen. FIG. 6 is a schematic of an example of the content displayed in conjunction with position information. The content includes information that is useful for shopping, such as bargain information. Simultaneously, a content display log indicating the displayed content is stored in the log storing unit 17.

Since the content-display control unit 16 automatically controls the content display based on the position information, unnecessary content display can be avoided and the screen can be smoothly switched.

Since the content-display control unit 16 stores the position information log of position information of the user and the content display log in the log storing unit 17, these logs can be used when analyzing the user's preferences, the user's movements, or the like.

The log storing unit 17 stores logs output from the content-display control unit 16. Specifically, it stores a position information log indicating an IR number detected by the IR-reception control unit 11, and a content display log indicating the content displayed by the content-display control unit 16.

The display-content storing unit 18 stores contents for local use that are downloaded from the store server 40.

Figures 7, 8, 9:
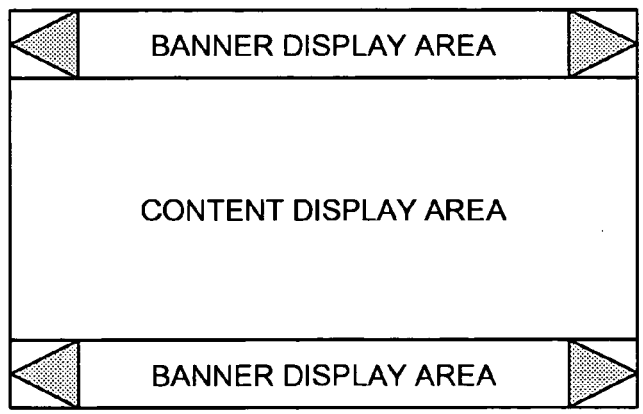
FIG. 7 is a table of an example of a position/content-related-setting storing unit.
FIG. 8 is a table of an example of a display-setting storing unit.
FIG. 9 is a schematic of an example of a screen configuration when outputting top and bottom banners.

The position/content-related-setting storing unit 19 stores position/content correspondence setting information that correlates the position information with the content. FIG. 7 is a table of an example of the position/content-related-setting storing unit 19. The position/content-related-setting storing unit 19 stores IR numbers, main content URLs, and map position coordinates, in correspondence with each other.

A main content URL corresponds to an IR number that represents a position where an IR transmitter is installed, and indicates the storage location of content displayed at the position. In a URL "C:¥Contents¥LMCM0001.swf" in the main content URLs shown in the example of FIG. 7, "C:¥Contents" represents the display-content storing unit 18 of the cart terminal apparatus 10, and "¥LMCM0001.swf" is the file name of the content. In "¥¥10.144.155.16¥Contents¥CMCM0002.swf", "¥¥10.144.155.16" is an IP address of the store server 40, "¥Contents" represents an entire-content storing unit 43 on the store server, and "¥CMCM0002.swf" is the file name of the content.

The map position coordinates are coordinates on the floor map, and are used by the main-menu control unit 14 to indicate the position of the cart on the map, when the user selects "Product Search" from the main menu.

By changing the relationship between the IR numbers, the main content URLs, and the map position coordinates stored in the position/content-related-setting storing unit 19 as appropriate, the contents of products can be displayed on the screen even when the location of those products within the store has been switched.

The display-setting storing unit 20 stores display setting information that includes set values for controlling the content display. FIG. 8 is a table of an example of the display-setting storing unit 20. The display-setting storing unit 20 includes set values for the reception polling timer, the position information reception number, the content activation timer, previous activation content avoidance, and the operation activation timer, used by the content-display control unit 16 when determining whether to display the content.

The value set as the reception polling timer is a time that represents the interval for executing a check of whether to display the content that is executed with respect to the IR number detected by the IR-reception control unit 11. When the value set as the reception polling timer is reduced, the position information log is minutely output, thereby enabling the movement line of the user to be recognized accurately when analyzing the log. When this value is increased, the position information log is output at wider intervals, whereby the log can be prevented from becoming too large. That is, the precision of log analysis and the output amount of the log can be adjusted by changing the set value.

The position information reception number is a number of identical position information received that is required to display the content. By setting this position information reception number, contents can be displayed only when the user remains at the same position for a fixed period of time. This avoids wasteful display of contents, such as when the cart moves quickly.

The content activation timer is a time that represents the interval at which contents are activated. By setting this content activation timer, it is becomes possible to prevent the continuation of an incomplete display by substituting contents that cannot be completely displayed on the screen with other contents, such as when it takes time to display the content in an area where the wireless LAN wave condition is poor.

The previous activation content avoidance is a determination flag for determining whether to avoid the output when content about to be displayed is already being displayed. In the example shown in FIG. 8, a setting of "1" indicates avoidance and "0" indicates no avoidance. Repeated switching of the same screen can be prevented by setting the previous activation content avoidance.

The operation activation timer is the time of avoiding the content display after the user operates the cart terminal apparatus 10. By setting this operation activation timer, it is possible to avoid the content display for a fixed period of time while the user is intentionally operating the cart terminal.

By changing the set values that are stored in the display-setting storing unit 20 as appropriate, the content-display control unit 16 can adjust its control of the content display according to the movements of the user and the status of the store.

The log transmitting unit 21 is a processor that transmits a log stored in the log storing unit 17 to the store server 40. Specifically, when the user completes payment at the cash desk, the log transmitting unit 21 transmits the position information log and the content display log that are stored in the log storing unit 17 to the store server 40 via the wireless LAN.

The content-distribution control unit 22 downloads contents from the store server 40 and stores them in the display-content storing unit 18. Specifically, when the power of the cart terminal apparatus 10 is turned on, the content-distribution control unit 22 refers to the entire-content storing unit 43 of the store server 40, downloads the content for local use, and stores it in the display-content storing unit 18. After the power is turned on, the content-distribution control unit 22 regularly updates the content by referring to the entire-content storing unit 43 of the store server 40 and downloading a modified part of the content for local use.

Since the content-distribution control unit 22 regularly updates the content in the display-content storing unit 18, if the contents of the entire-content storing unit 43 of the store server 40 are changed (e.g. when changing the prices of products by using a time service), the contents in all the cart terminal apparatuses 10 in the store are automatically updated, enabling up-to-date information to be provided to the user.

The setting-information extracting unit 23 downloads position/content correspondence setting information and display setting information from a setting-information storing unit 44 of the store server 40 and stores them in the position/content-related-setting storing unit 19 and the display-setting storing unit 20. When the power of the cart terminal apparatus 10 is turned on, the setting-information extracting unit 23 refers to the setting-information storing unit 44 of the store server 40, downloads the position/content correspondence setting information and the display setting information, and stores them respectively in the position/content-related-setting storing unit 19 and the display-setting storing unit 20.

The wireless communication unit 24 transmits/receives communications to/from the wireless base stations $4_1$ to $4_5$ that are connected to the store server 40 via the LAN.

The wireless base stations $4_1$ to $4_5$ are apparatuses that transmit/receive communications to/from the wireless communication unit 24 of the cart terminal apparatus 10.

The store server 40 is an apparatus that connects to the wireless base stations $4_1$ to $4_5$ via the LAN, and holds contents and setting information for distribution to the cart terminal apparatus 10. The store server 40 includes the product-information storing unit 41, the bargain-product-information storing unit 42, the entire-content storing unit 43, and the setting-information storing unit 44.

The product-information storing unit 41 stores information relating to each product. For each product it stores a product code, a product name, a product price, and coordinates that indicate the position of the product.

The bargain-product-information storing unit 42 stores bargain information for each product. Specifically, it stores a product code and a bargain price for each product.

The entire-content storing unit 43 stores contents for local use for distribution to the cart terminal apparatus 10, and contents for server use, such as contents relating to recipes and bargain products.

The entire-content storing unit 43 stores the contents for local use and the contents for server use separately. The content-distribution control unit 22 of the cart terminal apparatus 10 downloads only the contents for local use, and designates contents with a large amount of data, such as recipes, as contents for server use that are to be referred to when necessary. This avoids putting pressure on the storing units of the cart terminal apparatus 10.

The setting-information storing unit 44 stores the position/contents correspondence setting information and the display setting information for distribution to the cart terminal apparatus 10.

Although the cart terminal apparatus 10 displays one piece of content on the screen according to the present embodiment, the screen can also be configured by adding banner areas above and below.

FIG. 9 is a schematic of an example of a screen configuration when outputting top and bottom banners. As shown in FIG. 9, banner areas are provided above and below a content display area. This content display area displays contents such as bargain information in conjunction with the position information. Contents such as product advertisements in conjunction with the position information are displayed in the top and bottom banners.

FIG. 10 is a table of an example of the position/content-related-setting storing unit 19 when outputting the top and bottom banners. In addition to the main content URLs, the position/content-related-setting storing unit 19 also stores top banner URLs and bottom banner URLs. The content-distribution control unit 22 refers to the top banner URL and the bottom banner URLs, and displays the contents stored therein in the top and bottom banner areas, respectively.

When the user uses the cart terminal apparatus 10, the user can change the type of contents displayed on the screen by specifying recipe mode or bargain mode.

FIG. 11 is a table of an example of the position/content-related-setting storing unit 19 when setting a navigation mode. In addition to main content URLs, the position/content-related-setting storing unit 19 also stores recipe information URLs and bargain information URLs. According to the mode selected by the user, the content-distribution control unit 22 switches the URL to be used as a reference to before displaying the contents.

When the user uses the cart terminal apparatus 10, the user can input personal information such as sex and age, and contents on the screen can be displayed according to this personal information. In this case, URLs corresponding to patterns of personal information are stored in the position/content-related-setting storing unit 19, and the URLs to be used as references are switched according to respective patterns before displaying the contents.

Figure 12:
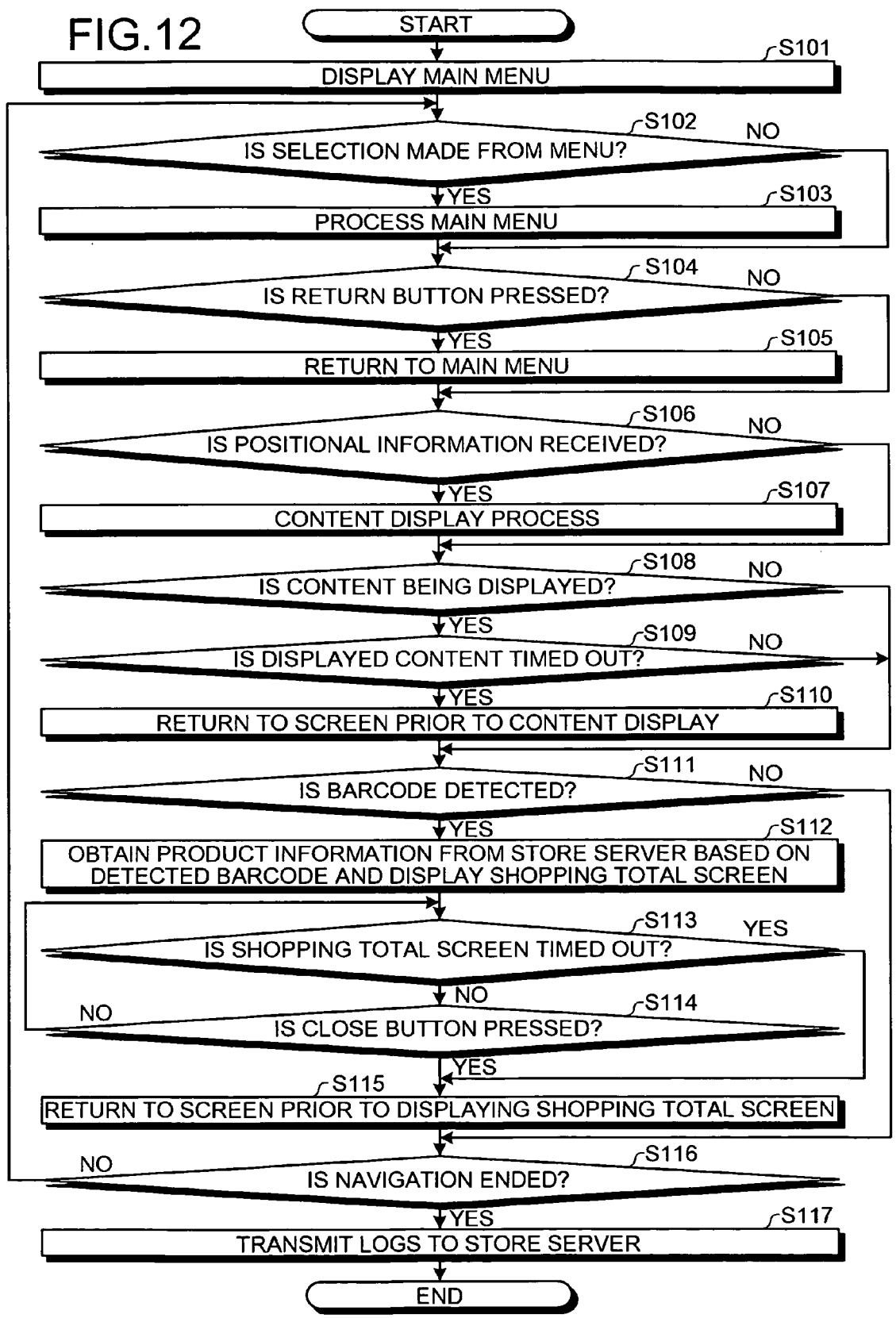
FIG. 12 is a flowchart of a processing procedure performed by the cart terminal apparatus according to the present embodiment.

FIG. 12 is a flowchart of a processing procedure performed by the cart terminal apparatus 10 according to the present embodiment. When the user starts to move the cart, the main-menu control unit 14 of the cart terminal apparatus 10 displays the main menu on the screen (step S101).

When the user selects one menu from among "Recipe", "Bargain", "Product Search", and "Shopping Total" (step S102), the main-menu control unit 14 processes the main menu by displaying a screen that corresponds to the selected menu (step S103).

When the user selects a return button on the displayed screen (step S104), the main-menu control unit 14 returns the screen display to the main menu (step S105).

When the IR receiver 50 receives position information transmitted by the IR transmitter (step S106), the content-display control unit 16 executes a content display process (step S107).

The content-display control unit 16 then determines whether the contents have been displayed for a fixed period of time (step S109), and if so, returns to the screen prior to displaying the contents (the main menu or a screen following menu selection) (step S110).

When the scanner 30 reads the barcode of the product (step S111), the shopping-total-display control unit 15 obtains the price of the product from the product-information storing unit 41 and the bargain-product-information storing unit 42 of the store server 40 based on the product code detected by the scanner control unit 12, and stores it as shopping list information. Simultaneously, the shopping-total-display control unit 15 displays a shopping total screen and outputs the total price of all the products stored as shopping list information at that point (step S112). When the shopping total screen has been displayed for a fixed period of time (step S113) or when the user selects a close button (step S114), the screen display returns to the screen prior to displaying the shopping total screen (the main menu or a screen following menu selection) (step S115).

When the user completes payment at the cash desk, navigation ends (step S116), and the log transmitting unit 21 transmits the logs of the user in the log storing unit 17 to the store server 40 (step S117). If the user continues shopping, the process returns to step S102 and the navigation continues.

When the main-menu control unit 14 displays the main menu on the screen and the IR receiver 50 detects position information, the content-display control unit 16 displays a screen of contents corresponding to the position information, and, after a fixed period of time, returns to the main menu. When the scanner 30 detects a barcode, the shopping-total-display control unit 15 displays the shopping total screen, and after a fixed period of time, returns to the main menu. This makes it possible to automatically switch the screens.

Figure 13:
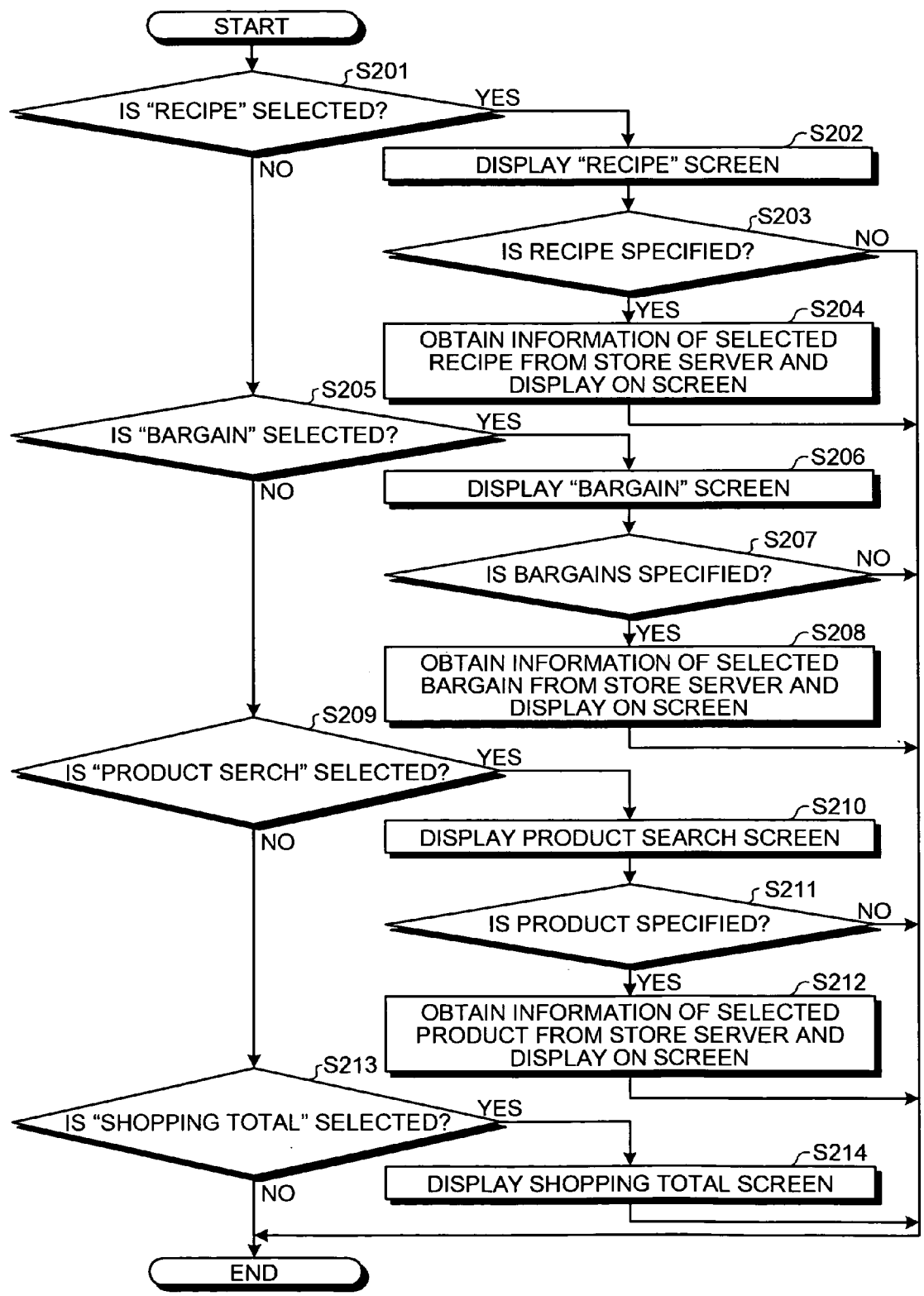
FIG. 13 is a flowchart of a processing procedure for a main menu process shown in FIG. 12.

FIG. 13 is a flowchart of a processing procedure for the main menu process shown in FIG. 12.

When "Recipe" is selected ("YES" at step S201), the main-menu control unit 14 displays a recipe guide screen (step S202). If the user specifies a recipe on the recipe screen ("YES" at step S203), the main-menu control unit 14 obtains content information of the specified recipe from the entire-content storing unit 43 of the store server 40, and displays it on the screen (step S204).

If the user selects "Bargain" ("YES" at step S205), a bargain guide screen is displayed (step S206). When the user specifies a bargain product on the bargain screen (step S207), the main-menu control unit 14 obtains content information of the specified bargain product from the entire-content storing unit 43 of the store server 40, and displays it on the screen (step S208).

If the user selects "Product Search" ("YES" at step S209), a product search screen is displayed (step S210). When the user specifies a product on the product search screen (step S211), the main-menu control unit 14 displays a floor map on the screen and outputs the position of the product and the position of the cart (step S212).

If the user selects "Shopping Total" ("YES" at step S213), the main-menu control unit 14 displays a shopping total screen and outputs all the products accumulated by the shopping-total-display control unit 15 and their total price (step S214).

As explained above, the user can easily obtain information the user wishes to refer to while shopping, and the locations of products the user requires, by operating the cart terminal apparatus 10 from the main menu.

Figure 14:
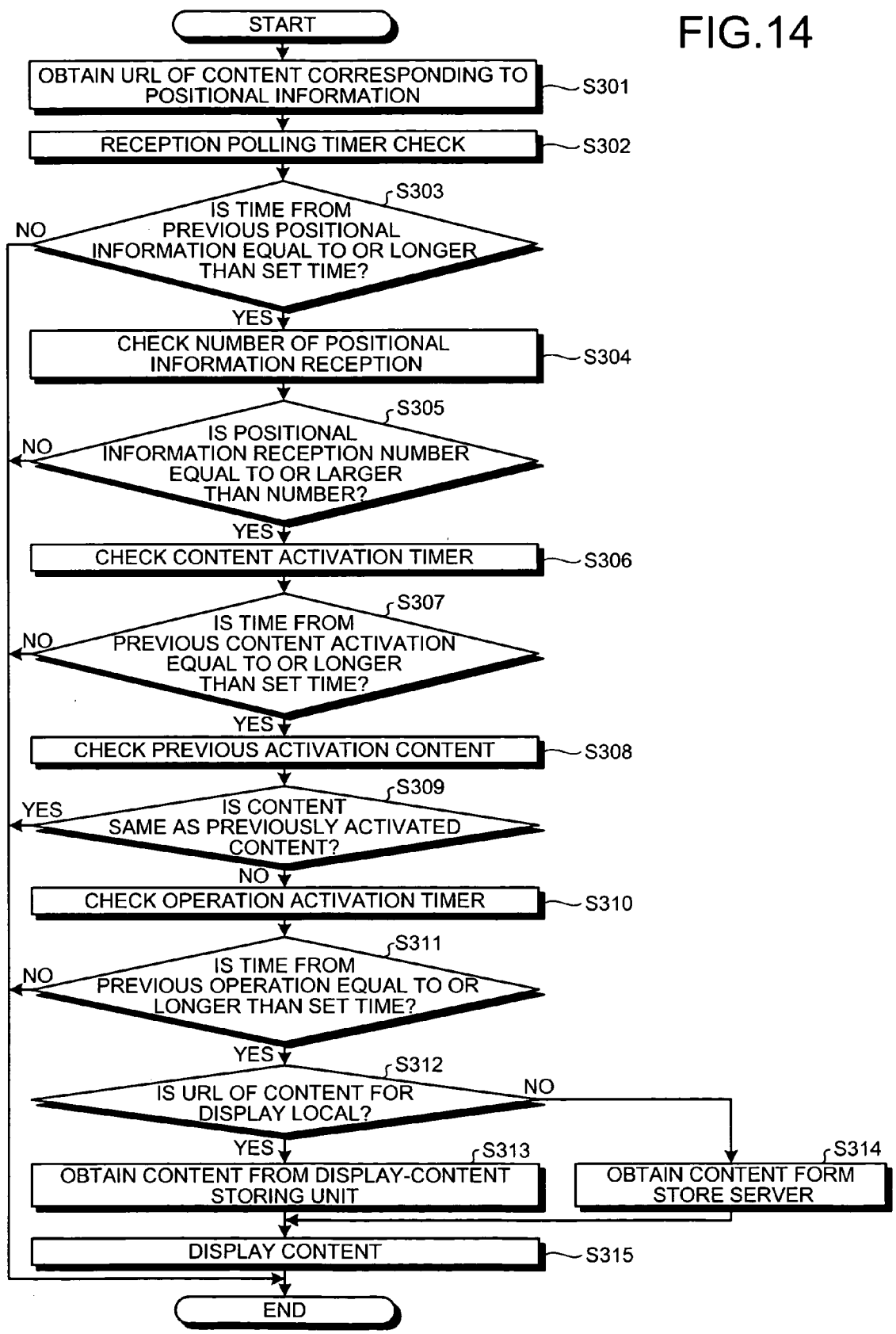
FIG. 14 is a flowchart of a processing procedure for a content display process shown in FIG. 12.

FIG. 14 is a flowchart of a processing procedure for the content display process shown in FIG. 12.

Based on the IR number detected by the IR-reception control unit 11, the content-display control unit 16 obtains the URL of the corresponding content from the position/content-related-setting storing unit 19 (step S301).

A reception-polling-timer check is then executed (step S302). The time from the previous position information reception is compared with a time set as a reception polling timer in the display-setting storing unit 20 (step S303), and, if the time from the previous position information reception is shorter, the process ends without displaying the content.

On the other hand, if the time from the previous position information reception is longer, the content-display control unit 16 executes a position information reception number check (step S304). Namely, the number of identical position information received is compared with a number set as a position information reception number in the display-setting storing unit 20 (step S305), and, if the number of identical position information received is lower, the process ends without displaying the content.

On the other hand, if the number of identical position information received is higher, the content-display control unit 16 executes a content activation timer check (step S306). Namely, the time from the previous content activation is compared with a time set as a content activation timer in the display-setting storing unit 20 (step S307), and, if the time from the previous content activation is shorter, the process ends without displaying the content.

On the other hand, if the time from the previous content activation is longer, the content-display control unit 16 executes a previous activation content check (step S308) by comparing the URL of the previous activated content with the URL of content corresponding to the received IR number (step S309). If the contents are identical, the process ends without displaying the content.

On the other hand, if the contents are different, the content-display control unit 16 executes an operation activation timer check (step S310) by comparing the time from when the user previously operated the terminal with a time set as an operation activation timer in the display-setting storing unit 20 (step S311). If the time from when the user previously operated the terminal is shorter, the process ends without displaying the content.

On the other hand, if the time from when the user previously operated the terminal is longer, based on the URL of the content corresponding to the position information (step S312), the content-display control unit 16 obtains the content from the cart terminal apparatus 10 or the store server 40 (steps 5313 and S314), and displays it on the screen (step S315).

Since the content-display control unit 16 determines whether to display contents based on set values for timers and numbers that are stored in the display-setting storing unit 20 as explained above, the content display can be switched smoothly.

As explained above, according to the present embodiment, the cart terminal apparatus 10 is installed on the cart 5 that moves with the user inside the store. Based on position information transmitted from the IR transmitters $2_1$ to $2_{13}$ installed at each sales section, the content-display control unit 16 obtains the position of the cart 5 inside the store, and, based on contents and the position information that are stored in correspondence in the position/content-related-setting storing unit 19, displays contents relating to products exhibited at nearby sales sections on the screen in real time. This enables information that is useful for shopping to be provided to the user in a timely fashion.

When the power of the cart terminal apparatus 10 is turned on, the content-distribution control unit 22 stores content from the entire-content storing unit 43 of the store server 40 in the display-content storing unit 18, and, after power is turned on, regularly downloads modified contents by referring to the store server 40 and updates the contents in the display-content storing unit 18. This enables up-to-date information to be provided to the user.

The main-menu control unit 14 displays a main menu on the screen, and, in conjunction with the IR receiver 50, the content-display control unit 16 displays contents in conjunction with the position information, switching to display of the main menu after a fixed period of time. In conjunction with the scanner 30, the shopping-total-display control unit 15 displays the shopping total screen, and, after a fixed period of time, switches back to the main menu. Therefore, the display screens can be automatically switched without the user having to operate the terminal.

While the explanation of this embodiment describes an example where an information terminal is installed in a cart terminal used by a user in a store such as a supermarket or a convenience store, the present invention is not limited to this. This invention can, for example, be similarly applied in an exhibition hall where visitors carry information terminals, and used in providing information about exhibits to them.

While this embodiment describes the cart terminal apparatus 10, a cart terminal program having similar functions can be also obtained by using software to realize the configuration of the cart terminal apparatus 10.

FIG. 15 is a functional block diagram of a computer 100 that executes a cart terminal program according to the present embodiment. The computer 100 includes a random access memory (RAM) 110, a central processing unit (CPU) 120, a hard disk drive (HDD) 130, a wireless LAN interface 140, a touch screen 150, and a personal computer (PC) interface 160.

The RAM 110 is a memory that stores programs, results obtained during execution of programs and the like. The CPU 120 is a central processing unit that reads programs from the RAM 110 and executes them.

The HDD 130 is a disk apparatus that stores programs and data. The wireless LAN interface 140 connects the computer 100 to another computer via a wireless LAN.

The touch screen 150 is a display that enables a user to operate the computer 100 by touching a screen with, for example, a finger of the user. The PC interface 160 connects the computer 100 to another computer.

A cart terminal program 111 to be executed by the computer 100 is stored in the database of another computer and the like that is connected via the PC interface 160 or the wireless LAN interface 140, and installed on the computer 100 by reading it from that database.

The installed cart terminal program 111 is stored in the HDD 130, and executed as a cart terminal process 121 when the CPU 120 reads it from the RAM 110.

According to the present invention, information that can be of interest to the user can be provided to the user in a timely fashion according to a position of the user, enabling the user to efficiently obtain helpful information.

Furthermore, according to the present invention, the frequency of information provided to the user can be adjusted, enabling the information to be provided to the user according to a movement of the user.

Moreover, according to the present invention, it is possible to avoid informing of wasteful information while the user continues to move.

Furthermore, according to the present invention, the interval at which the information is provided to the user can be adjusted, whereby the provision interval can be adjusted as appropriate, allowing the user to calmly acquire the information.

Moreover, according to the present invention, the user can easily obtain information relating to products that interest the user, enabling the user to efficiently acquire information relating to those products.

Furthermore, according to the present invention, the user can refer to information that matches intentions of the user at any time, whereby decisions of the user can be assisted at any time.

Moreover, according to the present invention, the provision of information can be switched without bothering the user, thereby reducing his/her operation load.

Furthermore, according to the present invention, information provided to the user can be automatically updated by updating the information of a server, enabling up-to-date information to be efficiently provided to the user.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile information-terminal apparatus that moves with a user and provides information to the user, the mobile information-terminal apparatus comprising:
    a position-related-information storing unit that stores related information for local use downloaded from a server storing related information related to an item arranged in each area;
    a setting-information storing unit that stores setting information correlating position information of the mobile information-terminal apparatus with URL (Uniform Resource Locator) of corresponding related information;
    a receiving unit that receives signals at regular intervals, the received signals transmitted from one of a plurality of transmitters installed in a site to respective areas that are allocated to the transmitters;
    a control unit that detects the position information based on the received signals, and determines whether the mobile information-terminal apparatus moves quickly or not by determining whether a number of times position information identical to position information previously received is detected is greater than a predetermined number of times; and
    a position-related-information informing unit that obtains the related information for local use from the position-related-information storing unit when the URL correlating with the detected position information indicates the mobile information-terminal apparatus, obtains related information of which amount of data is larger than that of the related information for local use from the server when the URL correlating with the detected position information indicates the server, and informs, when it is determined that the mobile information-terminal apparatus does not moves quickly, the user of the obtained related information.

2. The mobile information-terminal apparatus according to claim 1, wherein
    the control unit determines whether a first predetermined time has passed since a previous informing of the related information that corresponds to the position information, and
    the position-related-information informing unit informs, when it is determined that the first predetermined time has passed since the previous informing of the related information, the user of the related information that corresponds to the position information.

3. The mobile information-terminal apparatus according to claim 1, wherein
    the control unit determines whether to inform the user of the related information according to a set value that indicates whether to continuously inform the related information that corresponds to the identical position information, and
    the position-related-information informing unit informs, when it is determined to inform the related information, the user of the related information that corresponds to the position information.

4. The mobile information-terminal apparatus according to claim 1, wherein
    the control unit determines whether a second predetermined time has passed since a last operation by the user, and
    the position-related-information informing unit informs, when it is determined that the second predetermined time has passed since the last operation by the user, the user of the related information that corresponds to the position information.

5. The mobile information-terminal apparatus according to claim 1, further comprising a storing unit that stores the regular interval, the predetermined number of times, a first predetermined time for determining lapse time since a previous informing of the related information, a set value indicating whether to continuously inform the related information, and a second predetermined time for determining lapse time since a last operation by the user, as informing setting information, wherein
    the control unit determines whether to inform the user of the related information that corresponds to the position information based on the stored informing setting information.

6. The mobile information-terminal apparatus according to claim 1, further comprising:
    an item recognizing unit that recognizes a code appended to each item arranged in the site; and
    an item-information informing unit that informs the user of item-related information that corresponds to the code, based on the recognized code.

7. The mobile information-terminal apparatus according to claim 6, further comprising:
    an operation-information informing unit that obtains operation-related information that corresponds to an intention of the user, based on an operation by the user, and informs the user of the obtained operation-related information.

8. The mobile information-terminal apparatus according to claim 7, wherein each of the position-related-information informing unit, the item-information informing unit and the operation-information informing unit automatically switches information to be informed to the user between the related information, the item-related information, and the operation-related information.

9. The mobile information-terminal apparatus according to claim 1, further comprising:
    a position-related-information updating unit that downloads the stored related information for local use from the server and updates the related information for local use stored in the position-related-information storing unit.

10. The mobile information-terminal apparatus according to claim 1, further comprising:
    a position-correspondence-information storing unit that stores position correspondence information in which the position information is associated with the related information, wherein the position-related-information informing unit informs the user of the related information based on the stored position correspondence information.

11. The mobile information-terminal apparatus according to claim 10, further comprising:
   a position-correspondence-information updating unit that downloads the stored position correspondence information from a server and updates the position correspondence information.

12. The mobile information-terminal apparatus according to claim 1, further comprising:
   an informing-setting-information storing unit that stores the informing setting information; and
   an informing-setting-information updating unit that downloads the stored informing setting information from a server and updates the informing setting information.

13. The mobile information-terminal apparatus according to claim 1, wherein
   the position-related-information informing unit changes a type of the related information to be informed, based on a specification from the user.

14. The mobile information-terminal apparatus according to claim 1, wherein
   the position-related-information informing unit simultaneously informs the user of a plurality of pieces of the related information respectively corresponding to a plurality of types of position information.

15. The mobile information-terminal apparatus according to claim 1, wherein
   the control unit records the position information each time the position information is detected.

16. The mobile information-terminal apparatus according to claim 1, wherein
   the position-related-information informing unit records the related information informed to the user each time the related information is informed to the user.

17. A method of controlling a mobile information-terminal apparatus that moves with a user and provides information to the user, the method comprising:
   receiving signals at regular intervals, the received signals transmitted from one of a plurality of transmitters installed in a site to respective areas that are allocated to the transmitters;
   detecting position information based on the received signals;
   determining whether the mobile information-terminal apparatus moves quickly or not by determining whether a number of times position information identical to position information previously received is detected is greater than a predetermined number of times;
   obtaining related information for local use from a storing unit of the mobile information-terminal apparatus storing the related information for local use downloaded from a server storing related information related to an item arranged in each area, when URL (Uniform Resource Locator) correlating with the detected position information indicates the mobile information-terminal apparatus, the URL correlated with position information of the mobile information-terminal apparatus by setting information;
   obtaining related information of which amount of data is larger than that of the related information for local use from the server when the URL correlating with the detected position information indicates the server; and
   informing, when it is determined that the mobile information-terminal apparatus does not moves quickly, the user of the obtained related information.

18. A non-transitory computer-readable recording medium that stores a computer program for controlling a mobile information-terminal apparatus that moves with a user and provides information to the user, wherein the computer program causes a computer to execute:
   receiving signals at regular intervals, the received signals transmitted from one of a plurality of transmitters installed in a site to respective areas that are allocated to the transmitters;
   detecting position information based on the received signals;
   determining whether the mobile information-terminal apparatus moves quickly or not by determining whether a number of times position information identical to position information previously received is detected is greater than a predetermined number of times;
   obtaining related information for local use from a storing unit of the mobile information-terminal apparatus storing the related information for local use downloaded from a server storing related information related to an item arranged in each area, when URL (Uniform Resource Locator) correlating with the detected position information indicates the mobile information-terminal apparatus, the URL correlated with position information of the mobile information-terminal apparatus by setting information;
   obtaining related information of which amount of data is larger than that of the related information for local use from the server when the URL correlating with the detected position information indicates the server; and
   informing, when it is determined that the mobile information-terminal apparatus does not moves quickly, the user of the obtained related information.

* * * * *